T. P. HARDY.
Device for Holding Pipe-Fittings.

No. 160,319.

Patented March 2, 1875.

WITNESSES:
A. W. Almqvist
Alex. F. Roberts

INVENTOR:
T. P. Hardy
BY
ATTORNEYS.

T. P. HARDY.
Device for Holding Pipe-Fittings.
No. 160,319. Patented March 2, 1875.
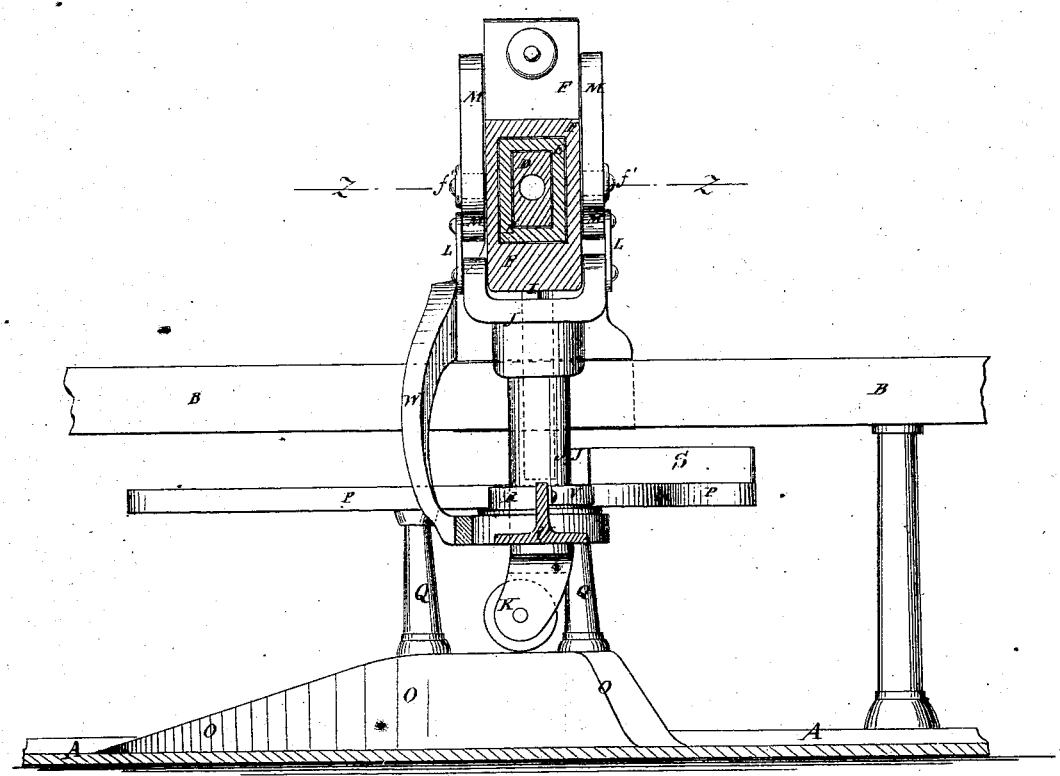
Fig. 3
Fig. 4
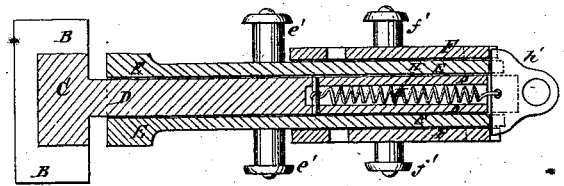
WITNESSES:
INVENTOR:

UNITED STATES PATENT OFFICE.

THOMAS P. HARDY, OF NEW YORK, N. Y.

IMPROVEMENT IN DEVICES FOR HOLDING PIPE-FITTINGS.

Specification forming part of Letters Patent No. 160,319, dated March 2, 1875; application filed December 5, 1874.

*To all whom it may concern:*

Figure 1:
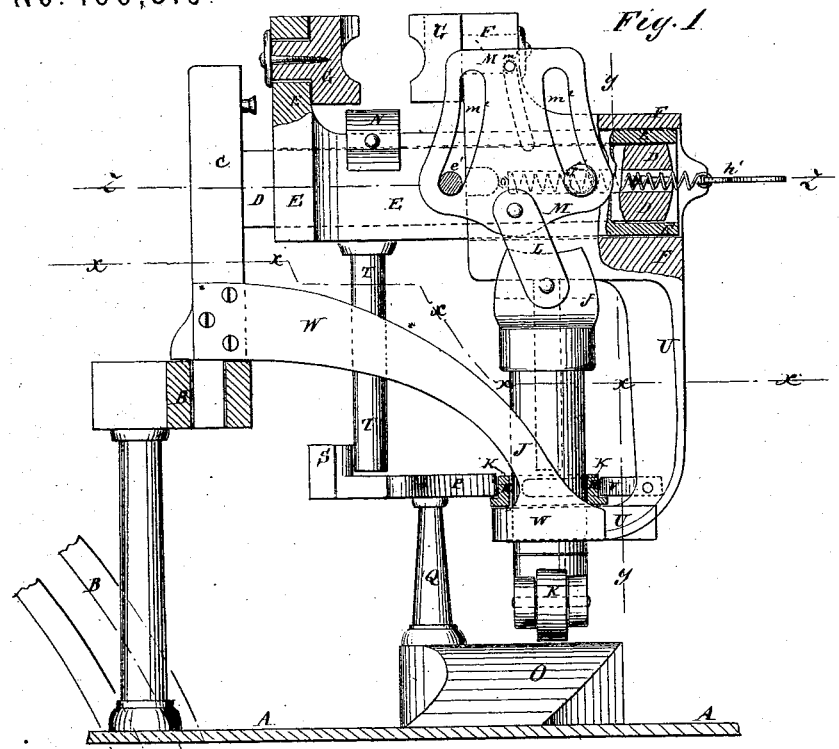
Figure 2:
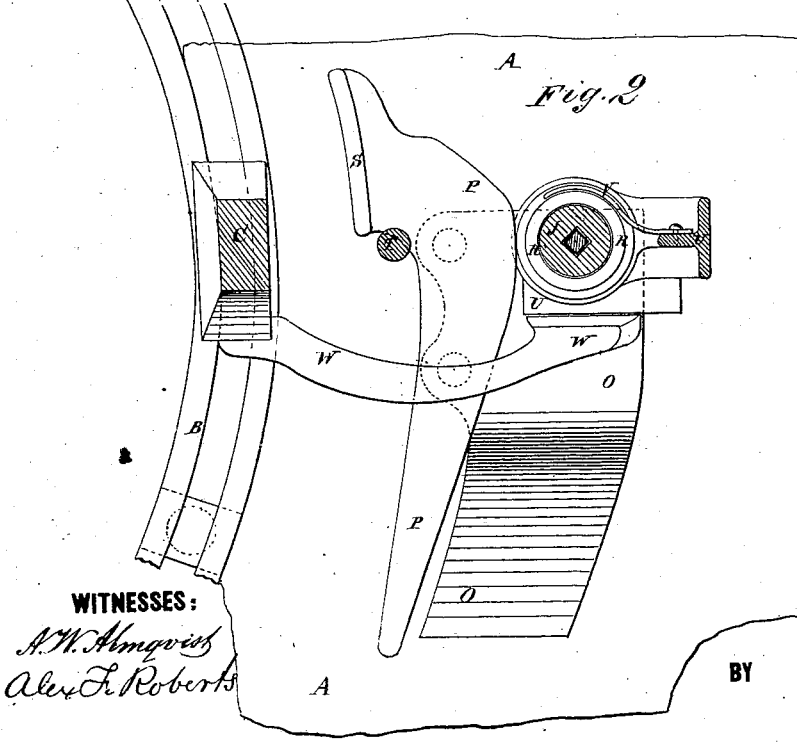

Be it known that I, THOMAS P. HARDY, of the city, county, and State of New York, have invented a new and useful Improvement in Adjustable Chuck for Holding Fittings, &c., while being tapped, of which the following is a specification:

Figure 1, Sheet 1, is a side view of my improved chuck, parts being broken away to show the construction. Fig. 2, Sheet 1, is a horizontal section of the same, taken through the line $x\ x$, Fig. 1. Fig. 3, Sheet 2, is an edge view of the same, partly in section, through the line $y\ y$, Fig. 1. Fig. 4, Sheet 2, is a horizontal section of the same, taken through the line $z\ z$, Fig. 1.

Similar letters of reference indicate corresponding parts.

My invention has for its object to furnish an improved chuck for holding pipe-fittings and other objects while being tapped, which shall be so constructed as to allow the fittings to center themselves upon the taps, which will open its jaws to receive and discharge the fittings, and will move said jaws out of line with the taps to allow the fittings to be conveniently inserted, and which shall be simple in construction and convenient in use.

The invention consists in the two movable jaws, the spring, and its cross-bar, in combination with the arm and its carrying-block; in the combination of the two slotted plates, the guide-pins, the links, the standard, and the guide-rod with the two movable jaws; in the combination of the track-inclines with the standard, the links, the slotted plates, and the two movable jaws; in the combination of the side guide and the loose collar with the standard, the links, the slotted plates, and the movable jaws; in the combination of the guide and arm with the movable jaws; in the combination of the brace-arms with the standard, the movable jaws, and the carrying-block, as hereinafter fully described.

A represents the stationary bed-plate of the machine, to which is attached a raised circular track, B, a segment of which is shown in the drawing, to receive the upright bar or block C, to the outer side of which is attached, or upon it is formed, a square arm, D. The arm D fits into the square cavity of the hollow arm, upon the upper side of the inner end of which is formed the inner jaw E. Upon the square hollow arm of the inner jaw E is fitted the square cavity of the arm of the outer jaw F. G are the blocks that receive and hold the fittings while being tapped, and the faces of which are so formed as to fit upon the said fittings and thus hold them securely. The blocks G are made with square shanks, which pass through square holes in the jaws E F, and are secured in place by screws and washers applied to their outer ends. The square shanks of the holding-blocks G are made a little smaller than the holes in which they are placed, so that the said blocks may have a slight vertical and lateral movement, to enable the fittings to center themselves upon the taps. This is especially important when the fittings happen to be cast thicker upon one side than the other, and insures a uniform depth of thread. The arm D is perforated longitudinally from its outer end, to receive the coiled spring H, the inner end of which is secured to the said arm D. To the outer end of the spring H is attached a cross-head, $h'$, which, when turned across the end of the arm D, rests in notches in the edges of the outer ends of the arms of the jaws E F, so as to hold them together to clamp the fittings and hold both jaws back against the upright block C, and at the same time allow both the jaws to be moved outward, to bring the said jaws out of line with the taps, and the outer jaw to be moved outward farther than the inner jaw, to open said jaws. To the lower side of the arm of the outer jaw F is rigidly attached a square rod, I, which fits into a longitudinal hole in the standard J, to keep said standard vertical as it moves up and down. To the lower end of the standard J is swiveled a caster-wheel, K, which rolls along the bed-plate A, or along a way formed upon or attached to said bed-plate. To lugs formed upon the opposite sides of the upper end of the standard J, are pivoted the lower ends of two links or connecting-bars, L, the upper ends of which are pivoted to the lower ends of the two plates M, placed upon the opposite sides of the hollow arm of the outer jaw F.

To the inner sides of the middle part of the upper ends of the plates M are attached guide-pins $m^1$, which enter inclined grooves in the sides of the jaw F. In the side parts of the plates M are formed two slots, $m^2$, which are inclined or curved so as to come nearer to each other as they extend upward. The forward slot $m^2$ receives a pin, $f'$, attached to the hollow arm of the outer jaw F, and the rear slot $m^2$ receives a pin, $e'$, attached to the hollow arm of the inner jaw E. The pins $f'$ $e'$ should have rollers or tubular washers placed upon them to diminish the friction, as the plates M move up and down upon them. By this construction, as the plates M are moved downward, the jaws E F are drawn together to clamp the fittings, and, as the said plates are moved upward, the said jaws are moved apart to allow the tapped fittings to drop out, and to allow another fitting to be inserted. As the fitting drops from the holding-blocks G of the jaws E F it falls upon an inclined plate, N, attached to the hollow arm of the inner jaw E, between the two jaws, by which it is guided away from the chuck, and falls upon the bed-plate A or into a receiver. The plates M are moved up and down to open and close the jaws E F by inclines O, formed on or attached to the bed-plate A, and along which the caster-wheel K rolls. The inclines O are so formed as to open the jaws E F to discharge the fitting, hold them open for a short time to allow another fitting to be inserted, and then to close them quickly when the fitting has been adjusted. P is a guide, supported a little above the inner parts of the inclines O by short posts Q, and against which rests a loose collar, R, placed upon the standard J. The guide P is so formed as to force both the jaws E F outward, after they have been opened, to carry the holding-blocks G out of line with the taps, so that another fitting can be conveniently inserted. The guide P also gives steadiness and firmness to the chuck while the jaws are being opened and closed. To the inner forward part of the guide P, or to some other suitable support, is attached a guide, S, against which strikes the side of the lower end of an arm, T, attached to the lower side of the inner end of the hollow arm of the inner jaw E to hold the jaws E F out from the block C after said jaws have been closed, and until the proper time for them to move inward to bring the fitting into line with the taps. U is an arm, the upper end of which is formed upon or rigidly attached to the lower side of the hollow arm of the outer jaw F. The lower end of the arm U is bent inward, and has a hole formed through it for the passage of the standard J to support said standard in a vertical position. The arm U also supports the loose collar R, so that it may always be in position to bear against the guide P. The loose collar R is kept from being raised from the arm U by the upward movement of the standard J by a stop, V, attached to the arm U, and which rests upon the flange formed upon the lower end of the said loose collar R. The collar R is also kept from being raised by the guide P, beneath which the flange of the said collar passes. The standard J is further held in a vertical position by the brace-arm W, the lower end of which rests against the rear side of the lower end of the arm U, and its upper end is rigidly attached to the rear side of the block C. The arm W prevents the rear end of the standard J from being forced to the rearward by the friction of the caster-wheel K against the inclines O, and the arm U prevents the said standard J from being forced outward by the friction of the guide P, thus keeping the said standard vertical.

It will be understood that the chuck or holder travels around the track, and that but one incline, O, is employed, the remainder of the circuit being required for running the taps into and withdrawing them from the fittings. Three taps form a set, one being arranged vertical, the others horizontal, and all are carried around the track with the chuck or holder.

Having thus described my invention, I claim as new and desire to secure by Letters Patent—

1. The two movable jaws E F, the spring H, and cross-bar $h'$, in combination with the arm D and carrying-block C, substantially as herein shown and described.

2. The combination of the slotted plates M, the guide-pins $m^1$ $f'$ $e'$, the links L, the standard J, and the guide-rod I, with the two movable jaws E F, substantially as herein shown and described.

3. The combination of the inclines O with the standard J, the links L, the slotted plates M, and the two movable jaws E F, substantially as herein shown and described.

4. The combination of the guide P and loose collar R with the standard J, links L, slotted plates M, and movable jaws E F, substantially as herein shown and described.

5. The combination of the guide S and arm T with the movable jaws E F, standard J, link L, and slotted plates M, substantially as herein shown and described.

6. The combination of the brace-arms U W with the standard J, the movable jaws E F, and the carrying-block C, substantially as herein shown and described.

THOS. P. HARDY.

Witnesses:
JAMES T. GRAHAM,
T. B. MOSHER.